(12) United States Patent
Tsai

(10) Patent No.: US 7,755,008 B2
(45) Date of Patent: Jul. 13, 2010

(54) ELECTRICAL ENERGY GENERATING APPARATUS

(76) Inventor: Hua-Hsin Tsai, No. 105, Jhongyang Rd., Jioucyong Village, Linnei Township, Yunlin County (TW)

( * ) Notice: Subject to any disclaimer, the term of this patent is extended or adjusted under 35 U.S.C. 154(b) by 631 days.

(21) Appl. No.: 11/641,807

(22) Filed: Dec. 20, 2006

(65) Prior Publication Data
US 2008/0150472 A1  Jun. 26, 2008

(51) Int. Cl.
*H05B 6/10* (2006.01)
*F23K 49/00* (2006.01)
(52) U.S. Cl. .................. 219/628; 219/643; 137/334
(58) Field of Classification Search ......... 219/600–631, 219/687, 772, 643; 137/34, 334; 138/33; 336/311, 338; 320/101; 322/33; 73/514.08; 310/90.5; 290/43, 54, 1; 977/928
See application file for complete search history.

(56) References Cited

U.S. PATENT DOCUMENTS 4,927,598 A * 5/1990 Nishino et al. .............. 376/306
5,675,306 A * 10/1997 Diaz ........................... 336/178
6,225,705 B1 * 5/2001 Nakamats ..................... 290/43
7,105,935 B2 * 9/2006 Hsu ............................... 290/2
7,109,597 B1 * 9/2006 Bose ............................ 290/43
2007/0276455 A1 * 11/2007 Fiset ............................ 607/91

* cited by examiner

Primary Examiner—Daniel L Robinson
(74) Attorney, Agent, or Firm—Rosenberg, Klein & Lee

(57) ABSTRACT

An electrical energy generating apparatus includes a hollow pipe, permanent magnetic fluid held in the hollow pipe, a ferrite film wrapped around the hollow pipe, a heat source receiving device joined to a portion of the hollow pipe, and an induction coil wound around the hollow pipe; the induction coil being connected to a storage battery; in use, the heat source receiving device will receive heat energy from heat sources so that a portion of the fluid is heated, and temperature and pressure difference comes into existence in the fluid, and convection in the liquid happens to circulate the nano-chip permanent magnets around the hollow pipe; therefore, there is change in a magnetic field between the nano-chip permanent magnets and the ferrite film, and in turn the induction coil produces electric field, and electrical energy is produced, and next stored in the storage battery.

3 Claims, 4 Drawing Sheets

ELECTRICAL ENERGY GENERATING APPARATUS

BACKGROUND OF THE INVENTION

1. Field of the Invention

The present invention relates to an electrical energy generating apparatus, more particularly one, which includes permanent magnetic fluid, an induction coil, and a ferrite film, and will receive heat energy for change to happen in magnetic field between the permanent magnetic fluid and the ferrite film, thus making the induction coil producing electrical energy to charge storage batteries.

2. Brief Description of the Prior Art

Sunlight, wind power, and water power are major sources of renewable energy, and can be used to generate electricity instead of petroleum in an environment friendly manner, thus helping reduce consumption petroleum and preventing supply of petroleum from running out too rapidly. However, there will be some difficulties in putting such sources of energy into use.

Electrical appliances are usually powered by either utility grid or batteries. For example, alarm clocks, toys, portable CD players, flashlights, automobiles, motorcycles, and cellular phones have to be used with batteries. Such batteries have to be either replaced with new ones or recharged after they run out. Common storage batteries have to be charged through a battery charger connected to the utility grid after they run out of power. Therefore, there will still be significant amount of energy consumed in charging batteries, and it is a main object of the present invention to provide an electrical energy generating apparatus to overcome the above-mentioned problems.

SUMMARY OF THE INVENTION

A preferred embodiment of an electrical energy generating apparatus of the present invention includes a hollow pipe, permanent magnetic fluid held in the hollow pipe, a ferrite film wrapped around the hollow pipe, a heat source receiving device joined to a portion of the hollow pipe, and an induction coil wound around the hollow pipe; the induction coil being connected to a storage battery. In use, the heat source receiving device will receive heat energy from heat sources so that a portion of the fluid is heated, and temperature and pressure difference comes into existence in the fluid, and convection in the liquid happens to circulate the nano-chip permanent magnets around the hollow pipe; therefore, there is change in a magnetic field between the nano-chip permanent magnets and the ferrite film, and in turn the induction coil produces electric field, and electric power is produced, and free electrons in the induction coil start flowing. Consequently, electrical energy is produced, and next stored in the storage battery.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
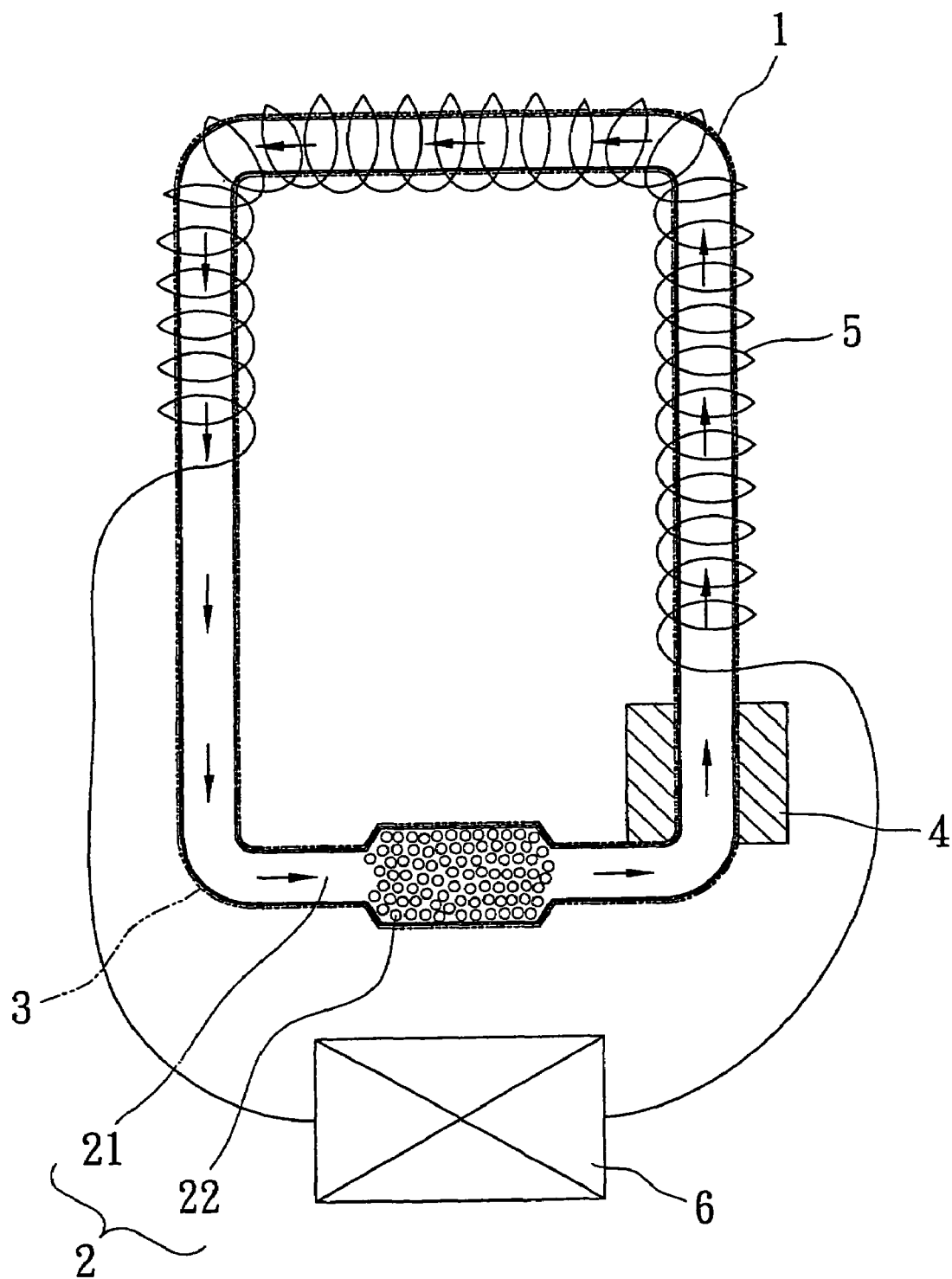
FIG. 1 is a sectional view of the present invention.

Referring to FIG. 1, a first preferred embodiment of an electrical energy generating apparatus includes a hollow pipe 1, permanent magnetic fluid 2, a ferrite film 3, a heat source receiving device 4, and an induction coil 5.

The permanent magnetic fluid 2 is a mixture of a fluid 21 and nano-chip permanent magnets 22, and held in the hollow pipe 1. The ferrite film 3 is wrapped around the hollow pipe 1. The heat source receiving device 4 is joined to one side of the hollow pipe 1 for receiving heat energy from solar energy and electrical energy, and heat energy such as is produced in burning coal and discharging exhaust. The induction coil 5 is wound around the hollow pipe 1, and connected to positive and negative poles of a storage battery 6 at two poles thereof respectively.

In use, the heat source receiving device 4 will receive heat energy from solar energy and electrical energy, and heat energy such as is produced in burning things so that a portion of the fluid 21 included in the permanent magnetic fluid 2 is heated, and temperature and pressure difference comes into existence in the fluid 21, and convection in the liquid 21 happens to circulate the nano-chip permanent magnets 22 mixed with the liquid 21 around the hollow pipe 1. Therefore, there is change in a magnetic field between the nano-chip permanent magnets 22 and the ferrite film 3, and the induction coil 5 produces electric field owing to the change in magnetic field, and in turn electric power is produced, and free electrons in the induction coil 5 start flowing. Consequently, electrical energy is produced, and next stored in the storage battery 6 through the two poles of the induction coil 5.

Figure 2:
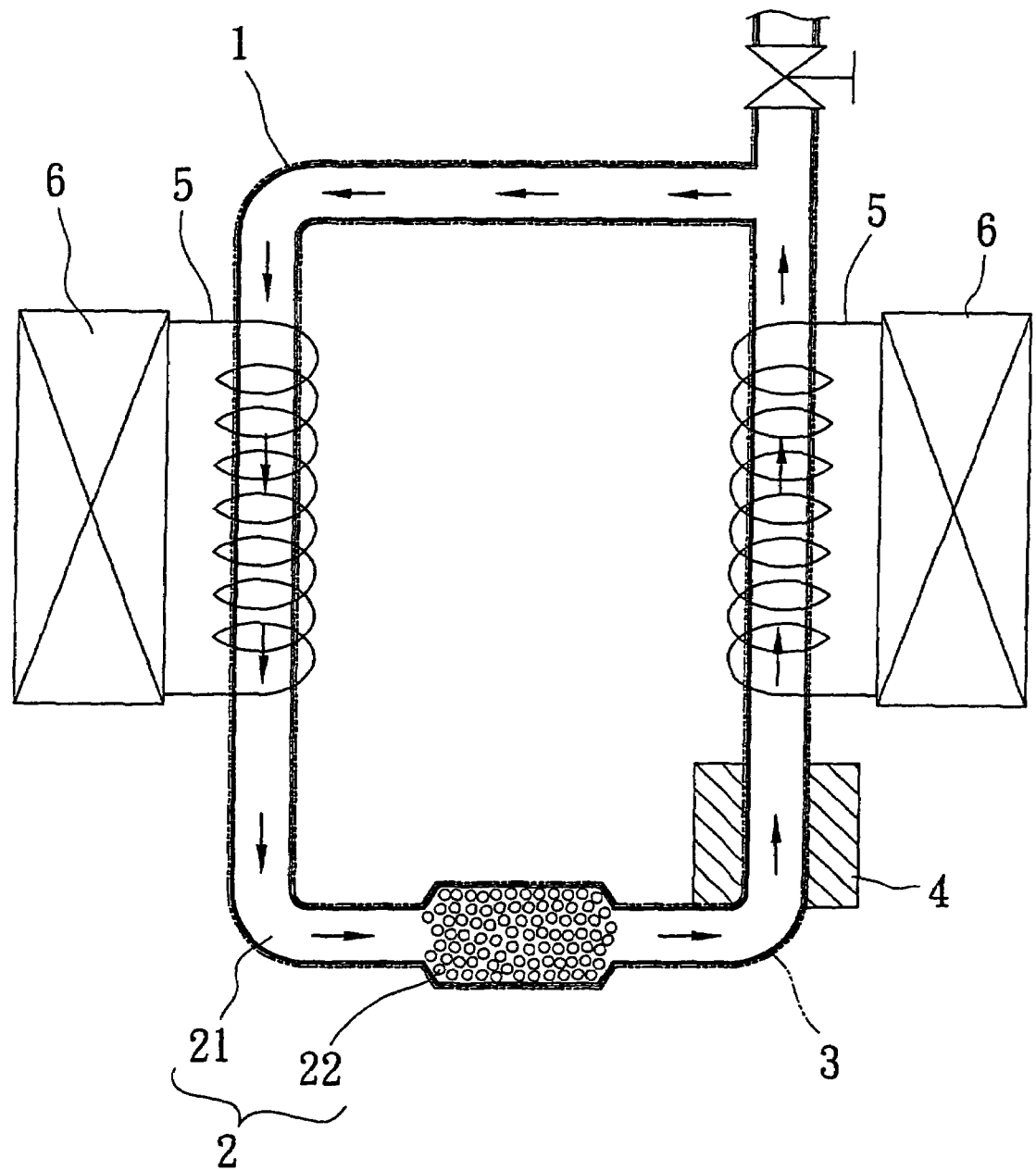
FIG. 2 is a sectional view of the second preferred embodiment of the present invention.

Referring to FIG. 2, a second preferred embodiment of an electrical energy generating apparatus of the present invention is provided, wherein several induction coils 5 are wound around a hollow pipe 1, and each is connected to a respective storage battery 6; thus, several storage batteries 6 can be charged through the present electrical energy generating apparatus at the same time.

Figure 3:
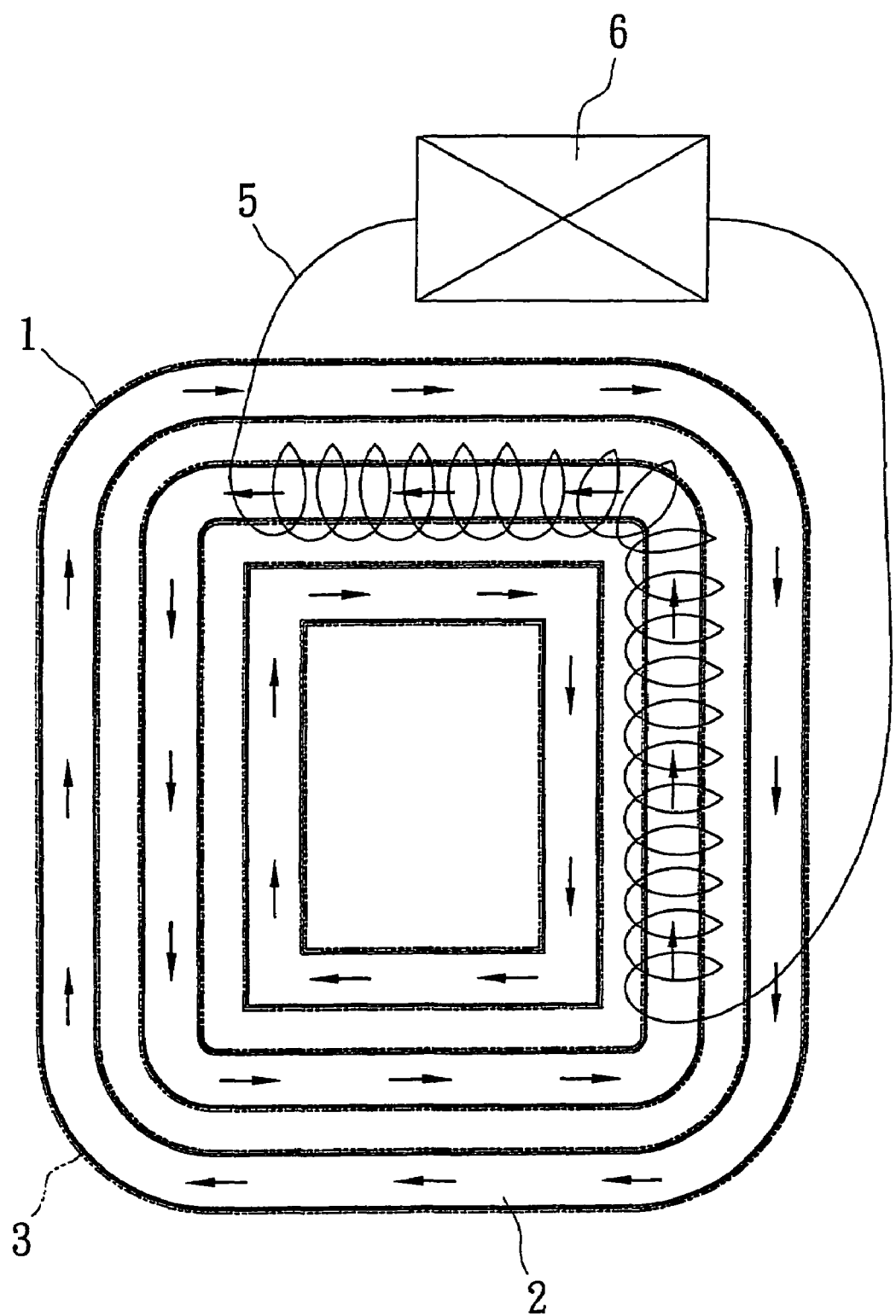
FIG. 3 is a view of the third preferred embodiment in use (1)
Figure 4:
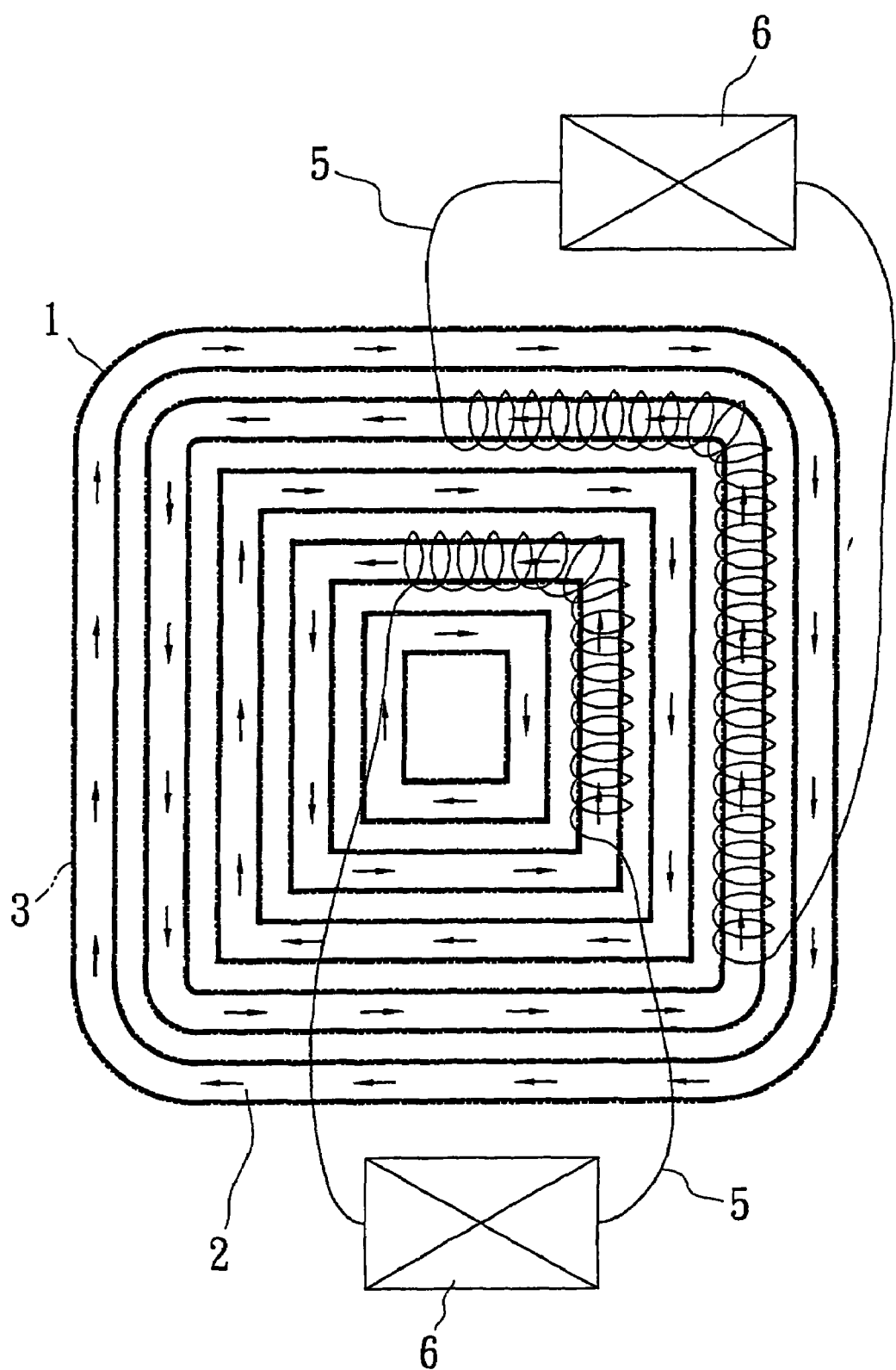
FIG. 4 is a view of the third preferred embodiment in use (2).

Referring to FIGS. 3 and 4, a third preferred embodiment of an electrical energy generating apparatus of the present invention has a hollow pipe 1 bent so as to form many loops; thus, the present electrical energy generating apparatus has increased electrical energy generating capability.

From the above description, it can be seen that the present invention has the following advantages:

1. The electrical energy generating apparatus of the present invention can convert heat energy into magnetic energy, and magnetic energy into electrical energy, and can receive the heat energy from various kinds of heat sources, e.g. solar energy, burning of things, and exhaust discharge. Therefore, the present invention is more convenient and environment friendly than conventional ways to generate electricity, e.g. by petroleum-driven electricity generators, wind-driven electricity generators, and water-driven ones.

2. The electrical energy generating apparatus of the present invention can charge several storage batteries at the same time therefore it is relatively convenient to use.

What is claimed is:

1. An electrical energy generating apparatus, comprising
a hollow pipe,
a permanent magnetic fluid held in the hollow pipe,
a ferrite film wrapped around an exterior of the hollow pipe for magnetically interacting with the permanent magnetic fluid within the hollow pipe,
a heat source receiving device secured to one side of a portion of the hollow pipe, and an induction coil wound around the hollow pipe; the induction coil being connected to positive and negative poles of a storage battery at two poles thereof respectively;

wherein said heat source receiving device receives heat energy from an external heat source and transfers heat energy to said permanent magnetic fluid for displacing said magnetic fluid in said hollow pipe with respect to said induction coil for generating electrical energy.

2. The electrical energy generating apparatus as recited in claim 1, wherein the permanent magnetic fluid is a mixture of a fluid and nano-chip permanent magnets.

3. The electrical energy generating apparatus as recited in claim 1, wherein the heat source receiving device can receive heat energy from solar energy, and heat energy such as is produced in burning coal and discharging exhaust.

* * * * *